(No Model.)
G. E. SOMERS & S. G. STODDARD.
SHADE HOLDER AND METHOD OF MAKING THE SAME.
No. 285,172. Patented Sept. 18, 1883.
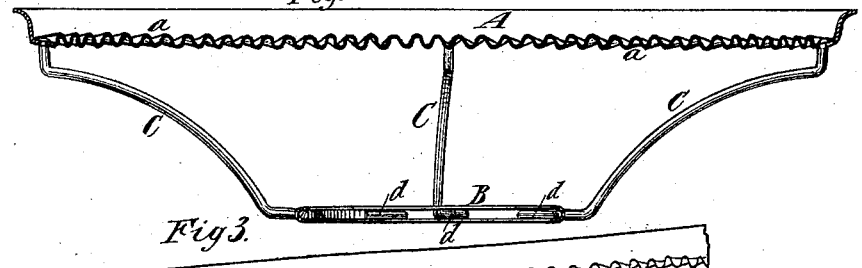
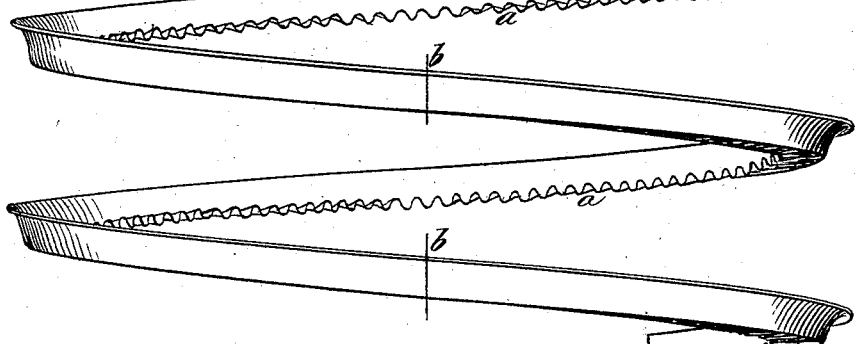
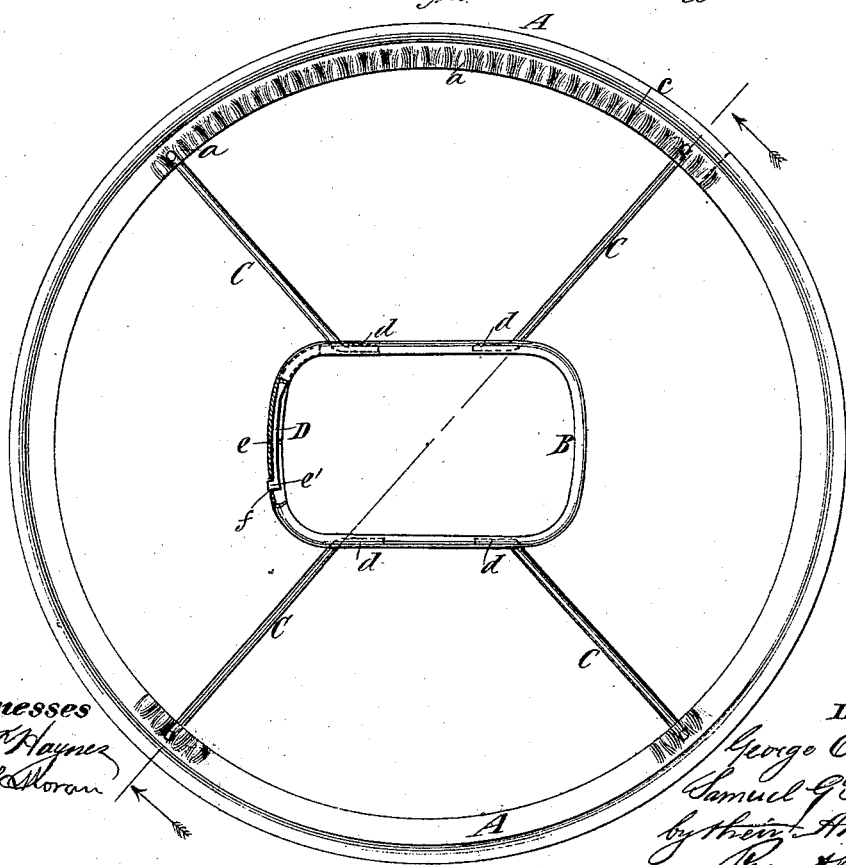
Witnesses
Inventor

UNITED STATES PATENT OFFICE.

GEORGE E. SOMERS AND SAMUEL G. STODDARD, OF BRIDGEPORT, CONN., ASSIGNORS TO THE BRIDGEPORT BRASS COMPANY, OF SAME PLACE.

SHADE-HOLDER AND METHOD OF MAKING THE SAME.

SPECIFICATION forming part of Letters Patent No. 285,172, dated September 18, 1883.

Application filed June 30, 1883. (No model.)

*To all whom it may concern:*

Be it known that we, GEORGE E. SOMERS and SAMUEL G. STODDARD, both of Bridgeport, in the county of Fairfield and State of Connecticut, have invented a certain new and useful Improvement in Shade-Holders and the Method of Making the Same, of which the following is a specification.

Our invention relates to shade-holders for lamps, which consist of an upper shade-supporting ring, a band adapted to fit a lamp-burner or lamp-collar, and arms connecting the two.

The invention includes an improved method of making the shade-supporting ring, which consists in crimping or corrugating the edge of a strip of metal, in producing a spiral therefrom, in cutting or sawing apart the coils of the spiral, and in joining the interrupted ends of each coil to form a ring.

The invention also consists in the combination, with a band and arms, of a shade-supporting ring attached to the arms, and having its inner edge crimped or corrugated. The ring is thereby rendered more ornamental, and if the arms are riveted to the ring their riveted ends may be in the depressions of the crimps or corrugations and below the bearing-points, on which the shade will rest.

In the accompanying drawings, Figure 1 is a vertical section of a shade-holder embodying our invention. Fig. 2 is a plan thereof, a part of the band being shown in section; and Fig. 3 is a portion of a spiral from which we make the shade-supporting rings of our holders.

Similar letters of reference designate corresponding parts in the several figures.

Our shade-holder consists of the usual parts—namely, a shade-supporting ring, A, a band, B, which is capable of being applied to a lamp-burner, and arms C, four of which are here shown, although any number may be used, as is required for shade-holders of various sizes.

In making our shade-supporting rings A, we first produce a spiral of the form shown in Fig. 3, having any number of coils or convolutions. This spiral is of the proper transverse section to produce the ring desired, and its inner edge or horizontally-extending portion is crimped or corrugated, as at $a$. To produce this spiral we take a long or continuous strip of metal of proper width, and by means of a machine comprising a suitable guide and crimping-rolls we give it the desired form, the inner edge being crimped as the spiral is formed. We then cut or saw the coils or convolutions of this spiral, as at the points $b$, and bring together and join the ends of the coils, so as to form perfect rings. We may lap the ends, as shown at $c$, Fig. 2, and solder or rivet them together, and the ends may be lapped more or less to form from the coil a ring of the exact size required.

The upper ends of the arms C may be soldered or riveted to the ring. If they are riveted, their ends may lie in the depressions formed by the crimps, and will then be below the bearing-points on which the shade will rest.

By the above-described method of manufacture we effect an economy in labor and produce a very strong ring, the appearance of which is enhanced by the crimping or corrugation.

The band B here shown is of oblong form; but our improved shade-supporting ring may be used with a band of any other form. The band B is formed of sheet metal, and is concave on the inner side. The ends of the arms C are inserted through the band and bent, so that they will lie in the concave of the band, as shown dotted at $d$ in Fig. 2. The band is divided or interrupted at $e$, and its adjacent ends are connected by a catch, which consists of an arm or piece, D, soldered or secured in the concave of the band on one side of the division $e$, and having a tooth or projection, $e'$, which engages with a hole or shoulder, $f$, in the band on the other side of said division. By pressing the tooth or projection $e'$ inward, it may be disengaged from the hole or shoulder $f$, and the band may then be sprung open or the ends sprung apart to enable it to be more readily placed in proper position on the article by which it is to be supported. The catch will then engage with the hole or shoulder $f$ and the band be firmly secured in place.

The band may be made of other material than sheet metal bent to give it a concave form. It may be made of wire, in which case it will be recessed on the inner side to make a place for the catch D.

What we claim as our invention, and desire to secure by Letters Patent, is—

1. The method of making shade-supporting rings for shade-holders, consisting in crimping or corrugating the edge of a strip of metal, in producing a spiral therefrom, in cutting or sawing apart the coils of the spiral, and in joining the interrupted ends of the coils to form rings, substantially as and for the purpose herein described.

2. The combination, with the band and arms of a shade-holder, of a shade-supporting ring having its inner edge crimped or corrugated, substantially as and for the purpose described.

GEO. E. SOMERS.
SAML. G. STODDARD.

Witnesses:
CHAS. B. JELLIFFE,
H. BIRDSEY.